(12) United States Patent
Andersson et al.

(10) Patent No.: US 12,571,338 B2
(45) Date of Patent: Mar. 10, 2026

(54) ENGINE SYSTEM COMPRISING A HYDROGEN COMBUSTION ENGINE

(71) Applicant: VOLVO TRUCK CORPORATION, Gothenburg (SE)

(72) Inventors: Lennart Andersson, Skällinge (SE); Jonas Jansson, Hönö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/333,164

(22) Filed: Jun. 12, 2023

(65) Prior Publication Data

US 2023/0399972 A1     Dec. 14, 2023

(30) Foreign Application Priority Data

Jun. 14, 2022     (EP) ..................................... 22179031

(51) Int. Cl.
    *F01N 3/035*        (2006.01)
    *B01D 53/94*        (2006.01)
    (Continued)

(52) U.S. Cl.
    CPC ....... *F01N 13/009* (2014.06); *B01D 53/9418* (2013.01); *B01D 53/9436* (2013.01);
    (Continued)

(58) Field of Classification Search
    CPC .......... F01N 3/021; F01N 3/035; F01N 3/208; F01N 3/2066; F01N 3/022; F01N 3/2803;
    (Continued)

(56) References Cited

U.S. PATENT DOCUMENTS 7,229,597 B2      6/2007   Patchett et al.
2010/0050604 A1*  3/2010   Hoard ................... F01N 3/0807
                                                              60/301

(Continued)

FOREIGN PATENT DOCUMENTS

CN        114382578   A        4/2022
DE      102019100099        *   7/2020

(Continued)

OTHER PUBLICATIONS

Extended European Search Report in corresponding European Application No. 22179031.4 dated Nov. 30, 2022 (7 pages).

*Primary Examiner* — Phutthiwat Wongwian
*Assistant Examiner* — Diem T Tran
(74) *Attorney, Agent, or Firm* — Jeffri A. Kaminski; Venable LLP

(57)        ABSTRACT

An engine system includes a hydrogen combustion engine and an exhaust aftertreatment system, EATS, configured to reduce emissions of the engine exhausts. The EATS comprises: an exhaust gas inlet for receiving engine exhaust from the hydrogen combustion engine; a plurality of emission reducing modules arranged downstream of the exhaust gas inlet and being configured to reduce emissions of the engine exhausts, the plurality of emission reducing modules comprising at least a first emission reducing module with a porous substrate including a powder coating and a selective catalyst reduction, SCR, coating, and a second emission reducing module being a selective catalyst reduction, SCR, catalyst unit. At least one of the first and second emission reducing modules is arranged as the first occurring emission reducing module of the EATS downstream of the exhaust gas inlet.

12 Claims, 4 Drawing Sheets

(51) Int. Cl.
| | |
| --- | --- |
| *B01J 23/22* | (2006.01) |
| *B01J 35/56* | (2024.01) |
| *F01N 3/022* | (2006.01) |
| *F01N 3/10* | (2006.01) |
| *F01N 3/20* | (2006.01) |
| *F01N 3/28* | (2006.01) |
| *F01N 13/00* | (2010.01) |

(52) U.S. Cl.
CPC .......... *B01D 53/9477* (2013.01); *B01J 23/22* (2013.01); *B01J 35/56* (2024.01); *F01N 3/022* (2013.01); *F01N 3/035* (2013.01); *F01N 3/106* (2013.01); *F01N 3/2066* (2013.01); *F01N 3/2803* (2013.01); *B01D 2251/2062* (2013.01); *B01D 2255/20723* (2013.01); *B01D 2255/9155* (2013.01); *B01D 2257/404* (2013.01); *B01D 2257/406* (2013.01); *B01D 2258/01* (2013.01); *B01D 2259/4566* (2013.01); *F01N 2370/02* (2013.01); *F01N 2510/068* (2013.01); *F01N 2610/1453* (2013.01)

(58) Field of Classification Search
CPC ............... F01N 13/009; F01N 2370/02; F01N 2610/1453; F01N 2510/068; F01N 13/0093; F01N 2330/06; F01N 2370/04; F01N 2570/18; F01N 2590/08; F01N 2610/02; F01N 3/0222; F01N 3/103; F01N 3/106; F01N 3/2828; B01D 53/9418; B01D 53/9436; B01D 53/9477; B01D 2258/01; B01D 2251/2062; B01D 2255/20723; B01D 2255/9155; B01D 2257/404; B01D 2257/406; B01D 2259/4566; B01J 23/22; B01J 35/56; Y02A 50/20; Y02T 10/12
See application file for complete search history.

(56) References Cited

U.S. PATENT DOCUMENTS

| | | | |
| --- | --- | --- | --- |
| 2013/0047583 A1 | 2/2013 | Driscoll et al. | |
| 2016/0310935 A1* | 10/2016 | Sutton .................. | B01J 29/7015 |
| 2020/0263586 A1* | 8/2020 | Hallstrom .............. | B01J 29/763 |
| 2022/0080355 A1* | 3/2022 | Mueller ............. | B01D 53/9472 |

FOREIGN PATENT DOCUMENTS

| | | | | |
| --- | --- | --- | --- | --- |
| DE | 102020006451 | * | 3/2021 | |
| DE | 102020209154 A1 | | 1/2022 | |
| WO | WO 2011151711 | * | 12/2011 | ............. B01D 39/20 |
| WO | WO-2018073750 | * | 4/2018 | |
| WO | 21257549 A1 | | 12/2021 | |
| WO | 2022000012 A1 | | 1/2022 | |

* cited by examiner

ENGINE SYSTEM COMPRISING A HYDROGEN COMBUSTION ENGINE

TECHNICAL FIELD

The present invention relates to an engine system comprising a hydrogen combustion engine and an exhaust aftertreatment system, EATS, configured to reduce emissions of the engine exhausts. The invention further relates to a vehicle comprising such engine system.

The invention is applicable on vehicles, in particularly heavy vehicles, such as e.g. trucks. However, although the invention will mainly be described in relation to a truck, the engine system is also applicable for other type of vehicles, such as buses, passenger cars, industrial construction machines, wheel loaders, etcetera.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the described demands, various engine concepts have been developed throughout the years where conventional combustion cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically).

However, even though the engine is subject to adaptations in order to operate on the new fuel, certain parts of the engine, e.g. the lubrication of the reciprocating piston in the cylinder, is often kept relatively unchanged. For a hydrogen combustion engine, lubrication oil slipping to the combustion chamber may be a source for particulates. Moreover, NOx is typically formed during the high temperature combustion process, why cleaning of the engine exhausts is required. There is thus a need in the industry for engine system comprising an adapted exhaust aftertreatment system, EATS, to handle emissions from the hydrogen combustion engine.

SUMMARY

It is an object of the present invention to at least partly alleviate the shortcomings discussed above in relation to known exhaust aftertreatment system, and provide an improved exhaust aftertreatment unit.

According to a first aspect of the present invention, an engine system comprising a hydrogen combustion engine and an exhaust aftertreatment system, EATS, configured to reduce emissions of the engine exhausts, is provided. The EATS of the engine system comprises:

an exhaust gas inlet for receiving engine exhaust from the hydrogen combustion engine;

a plurality of emission reducing modules arranged downstream of the exhaust gas inlet and being configured to reduce emissions of the engine exhausts, the plurality of emission reducing modules comprising at least:

a first emission reducing module with a porous substrate having an inlet face and an outlet face, the porous substrate comprising inlet channels extending from the inlet face, and outlet channels extending from the outlet face; the inlet channels and the outlet channels being separated by a plurality of filter walls having a porous structure; the inlet channels of the porous substrate being loaded with a powder coating configured to filter particles from the engine exhaust, and the porous structure of the filter walls and/or the outlet channels of the porous substrate being loaded with a selective catalyst reduction, SCR, catalyst coating;

a second emission reducing module being a selective catalyst reduction, SCR, catalyst unit;

wherein one of the first and second emission reducing modules is arranged as the first occurring emission reducing module of the EATS downstream of the exhaust gas inlet.

Hereby, an engine system comprising an EATS which reduce at least the NOx emissions and particulate emission in an efficient manner is provided. Moreover, a compact and appropriate EATS for the hydrogen combustion engine is provided. That is, the EATS may be made less complex, and more compact, as compared to conventional EATS used for reducing NOx emissions and particulate emissions from a diesel engine. In particular, particulate emissions, such as e.g. sulphur containing emissions, is caught by the porous structure and the powder coating, reducing the deterioration of any downstream arranged SCR catalyst. Moreover, by providing SCR catalyst capabilities in both the first and second emission reducing modules, the reduction of NOx emissions can be achieved in an efficient manner. By stating that one of the first and second emission reducing modules is arranged as the first occurring emission reducing module of the EATS downstream of the exhaust gas inlet, the first or second emission reducing module is thus arranged in the EATS to receive unfiltered exhaust gases from the exhaust gas inlet. Unfiltered exhaust gases thus refers to exhaust gases which have not been filtered and/or which have not been subject to emission reduction compared to the exhaust gases at the exhaust gas inlet (or the engine exhaust from the hydrogen combustion engine). In other words, the exhaust gases is the same or substantially the same, at least with regards to particulates and emissions in the exhaust gases, at the exhaust gas inlet as at the inlet to the first or second emission reducing module (whichever being arranged as the first occurring emission reducing module of the EATS downstream of the exhaust gas inlet). Correspondingly, the exhaust gases is (substantially) different, at least with regards to particulates and/or other emissions in the exhaust gases, prior to compared to after an emission reducing module. Thus, during operation of the EATS, each one of the emission reducing modules reduces particulates and/or other emission of the engine exhausts. The emissions referred to here may e.g. be NOx emissions.

By the alternative of arranging the first emission reducing module as the first occurring emission reducing module of the EATS downstream of the exhaust gas inlet, the exhaust gases first encounter the porous structure and the powder coating, wherein particulate emissions, such as e.g. sulphur containing emissions, is filtered from the exhaust gases, thereby reducing the deterioration of any downstream arranged SCR catalyst (as the SCR catalyst coating, and the SCR catalyst unit). Moreover, the porous filter may be easily accessible in the EATS as the porous filter is comprised in the first occurring emission reducing module of the EATS downstream of the exhaust gas inlet, and may thus be made accessible for maintenance or exchange. For example, the porous filter may be accessed via the exhaust gas inlet.

By the alternative of arranging the second emission reducing module as the first occurring emission reducing module of the EATS downstream of the exhaust gas inlet, the exhaust gases first encounter the SCR catalyst unit and NOx emissions may be efficiently reduced. Moreover, the SCR catalyst unit may be easily accessible in the EATS as the SCR catalyst unit is comprised in the first occurring emission reducing module of the EATS downstream of the exhaust gas inlet, and may thus be made accessible for maintenance or exchange. For example, the SCR catalyst unit may be accessed via the exhaust gas inlet.

By the invention, an improved engine system having an EATS which provides a highly efficient removal of emission of the exhaust gases, while reducing the complexity of the EATS and providing easy access to the emission reducing modules, is provided.

According to at least one example embodiment, the first emission reducing module is arranged as the first occurring emission reducing module of the EATS downstream of the exhaust gas inlet.

According to at least one example embodiment, the second emission reducing module is arranged as the first occurring emission reducing module of the EATS downstream of the exhaust gas inlet.

It should be understood that the different emission reducing modules in the EATS are forming different units. For example, each emission reducing module may comprise a container or canister housing the emission reducing components, such as the porous filter and the SCR catalyst. That is, for the first and second emission reducing modules, the first emission reducing module may comprises a first container or canister housing the porous filter with the powder coating and the SCR catalyst coating, and the second emission reducing module may comprises a second container or canister housing the SCR catalyst unit (e.g. being a monolith with a metal-zeolite coating). Thus, the second container or canister is separate from, and different to, the first container or canister. Stated differently, the porous substrate of the first emission reducing module may be packaged in a first shell, e.g. a stainless steel shell, having an inlet and an outlet in fluid communication with the fluid pathway. Correspondingly, the SCR catalyst unit of the second emission reducing module may be packaged in a second shell, e.g. a stainless steel shell, having an inlet and an outlet in fluid communication with the fluid pathway.

According to at least one example embodiment, the inlet channels of the porous substrate extend from the inlet face and towards, but no to, the outlet face. Thus, the inlet channels are closed, or blinded, at one of their respective ends. Correspondingly, the outlet channels of the porous substrate extend from the outlet face and towards, but not to, the inlet face. Thus, the outlet channels are closed, or blinded at one of their respective ends. The porous substrate may be referred to as a wall-flow filter.

According to at least one example embodiment, the plurality of emission reducing modules further comprises a third emission reducing module selected from: an oxidation catalyst, an ammonia slip catalyst, a secondary particulate filter, wherein the third emission reducing module is arranged downstream of the first or second emission reducing module whichever being arranged as the first occurring emission reducing module of the EATS downstream of the exhaust gas inlet, or is arranged downstream of both of the first and second emission reducing modules.

Hereby, the EATS may be improved owing to the functionality of the third emission reducing module, without reducing the advantageous effects of the first and second emission reducing modules previously mentioned. For example, by means of an ammonia slip catalyst arranged downstream of the first emission reducing module and/or the second emission reducing module, any ammonia slip from the corresponding SCR catalyst may be handled.

According to at least one example embodiment, the EATS further comprises:
an injector configured to inject a reductant for providing ammonia to the SCR catalyst coating and/or the SCR catalyst unit, wherein the injector is arranged upstream of the first and second emission reducing modules, and downstream of the exhaust gas inlet.

Hereby, during operation of the EATS, reductant is injected upstream the SCR catalyst coating and/or the SCR catalyst unit. Thus, the flow of exhaust gases through the EATS transports the injected reductant to the SCR catalyst coating and/or the SCR catalyst unit. By arranging one of the first and second emission reducing modules as the first occurring emission reducing module of the EATS downstream of the exhaust gas inlet, the positioning of the injector may be more freely chosen as there is no other emission reducing module between the exhaust gas inlet and first occurring emission reducing module being either the first or second emission reducing module. The injector may be arranged anywhere between the exhaust gas inlet and the first occurring emission reducing module. It should be noted that the injector is not an emission reducing module in the sense of the invention, but it may, according to at least one example embodiment, be comprised in either the first or second emission reducing module, whichever being arranged as the first occurring emission reducing module of the EATS downstream of the exhaust gas inlet.

According to at least one example embodiment, the SCR catalyst coating of the first emission reducing module is a Vanadia-based coating. Alternatively, the SCR catalyst coating of the first emission reducing module is a coating of a metal-zeolite, such as e.g. Cu-zeolite or Fe-zeolite.

The porous substrate may have been loaded with the SCR catalyst coating using a washcoat. That is, the SCR catalyst coating may be applied by means of a washcoat, i.e. be applied to the porous substrate by means of an aqueous slurry, dried and calcined. Hereby, application of the SCR catalyst coating in the porous structure of the filter walls and/or of the outlet channels of the porous substrate is facilitated. As an alternative, the SCR catalyst coating may be applied by means of a powder.

According to at least one example embodiment, the porous substrate has been loaded with a dry powder comprising a metal oxide. The metal oxide may e.g. be in the form of aerosols of alumina, silica or titania, or fumed alumina, fumed silica or fumed titania.

Such application of the powder coating is advantageous when coating the inlet channels of the porous substrate.

According to at least one example embodiment, the powder use for the powder coating is a dry powder. For example, the dry powder is characterized by a d50 (by volume) less than 25 microns, preferably less than 20 microns, more preferably less than 10 microns. The dry powder may comprise one or more refractory powders, preferably comprising one or more fumed refractory powders, and or one or more aerogels. The one or more fumed refractory powders may be produced by a pyrogenic process, for example flame pyrolysis. The one or more fumed refractory powders may comprise one or more of fumed alumina, fumed silica, fumed titania, other fumed metal oxide and fumed mixed oxides.

According to at least one example embodiment, the porous substrate has been loaded with the powder coating by a loading of <10 g/L of dry powder, preferably <5 g/L of dry powder, preferably <2 g/L of dry powder.

Here, litres, L, refers to the filter volume of the porous substrate.

According to at least one example embodiment, the dry powder used for the powder coating has a tapped density of less than 0.10 g/cm3, optionally less than 0.08 g/cm3, optionally less than 0.07 g/cm3, optionally less than 0.06 g/cm3, optionally less than 0.05 g/cm3. The tapped density may e.g. refer to the tapped density of the powder as measured according to Method 1 of Section 2.9.35 of European Pharmacopoeia 7.0 with 1250 taps.

According to at least one example embodiment, the powder coating concentration relative to a filter volume of the porous substrate is ranging from 0.01 g/L to 60 g/L.

Hereby, an efficient use of the powder coating relative to the particulate filtration is achieved.

According to at least one example embodiment, the SCR catalyst coating concentration relative to a filter volume of the porous substrate is ranging from 10 g/L to 150 g/L.

Hereby, an efficient use of the SCR catalyst coating relative to the NOx reduction is achieved.

According to at least one example embodiment, the SCR catalyst unit is of a metal zeolite type, e.g. Cu-zeolite or Fe-zeolite. According to at least one example embodiment, the SCR catalyst unit is an SCR catalyst stone. The substrate of the SCR catalyst unit may e.g. be a monolith, e.g. a ceramic monolith.

According to at least one example embodiment, the EATS is free of any oxidation catalyst arranged downstream of the exhaust gas inlet and upstream of the first and second emission reducing modules.

That is, the unfiltered and unreacted exhaust gases from the exhaust gas inlet, possibly with the addition of reductant from the injector, is fed to the first or second emission reducing module.

According to at least one example embodiment, the hydrogen combustion engine is configured to be operated by an Otto cycle.

It should be understood that the hydrogen combustion engine is an internal combustion engine configured to combust hydrogen in combustion cylinders of the engine.

For example, the hydrogen combustion engine is configured to be operated by four-stroke combustion in the combustion cylinders. Typically, the hydrogen combustion engine is configured to be operated by a lambda of between 1.5 and 3.

According to at least one example embodiment, the first occurring emission reducing module being either the first or second emission reducing module comprises a first end portion being a downstream end portion having a first end surface (or downstream facing surface) facing downstream of a fluid pathway in the EATS, and comprises an opposite second end portion or upstream end portion having a second end surface (or upstream facing surface) facing upstream of the fluid pathway. With reference to the first emission reducing module, the first end surface corresponds to the outlet face, and the second end surface corresponds to the inlet face.

According to at least one example embodiment, the exhaust gas inlet defines the interface between the hydrogen combustion engine and the EATS. Thus, the exhaust gas inlet is the furthest upstream portion of the EATS, thus being an end-point of the EATS. The EATS typically comprise a fluid pathway for the exhaust gases from the hydrogen combustion engine extending from the exhaust gas inlet to an outlet of the EATS. According to at least one example embodiment, the fluid pathway between the exhaust gas inlet and the first occurring emission reducing module being either the first or second emission reducing module is defined by a pipe portion. That is, no emission reducing module is arranged along such pipe portion, as an upstream end of the pipe portion is defined by the exhaust gas inlet and a downstream end portion of the pipe portion ends in the first occurring emission reducing module. According to at least one example embodiment, the previously mentioned second end surface is arranged to face the exhaust gas inlet. According to at least one example embodiment, the first occurring emission reducing module being either the first or second emission reducing module is arranged adjacent, and subsequently to, the exhaust gas inlet. Stated differently, the first occurring emission reducing module being either the first or second emission reducing module is arranged downstream, and next to, the exhaust gas inlet.

According to at least one example embodiment, the reductant used by the injector is at least one of the following: anhydrous ammonia, aqueous ammonia, urea, aqueous urea and a diesel exhaust fluid. According to at least one example embodiment, the reductant is urea or liquid urea.

According to at least one example embodiment, each one of the SCR catalyst coating and SCR catalyst unit is configured to convert nitrogen oxides, NOx, with the aid of a catalyst into diatomic nitrogen, N, and water and/or carbon dioxide, CO2. During operation of the EATS, the injected reductant (or the resulting ammonia) is reacted onto the catalyst.

According to at least one example embodiment, the engine system comprises a controller configured to control e.g. the introduction of reductant into the fluid pathway of the exhaust gases, various sensors at various locations in the EATS, for example NOx sensors located at, or proximate, the exhaust gas inlet and outlet of the EATS, and/or temperature sensors, and/or pressure sensors, located before and after any one of the emission reducing modules.

According to a second aspect of the invention, a vehicle is provided. The vehicle comprises the engine system according to the first aspect of the invention.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
FIG. 1 is a schematic side view of a vehicle comprising an engine system in accordance with an example embodiment of the invention.

With reference to FIG. 1 a vehicle 1, here embodied as a heavy duty truck 1, is shown for which an engine system 10 of a kind disclosed in the present disclosure is advantageous. However, the engine system 10 may as well be implemented in other types of vehicles, such as in busses, light-weight trucks, passenger cars, marine applications etc. The engine system 10 of the vehicle 1 of FIG. 1 comprises a hydrogen combustion engine 15 and an exhaust aftertreatment system, EATS, 20 configured to reduce emission of the engine exhausts. However, the vehicle may according to at least one example embodiment be a hybrid vehicle further comprising an electric machine 16 (optionally). The hydrogen combustion engine 15 is powered by hydrogen fuel, typically comprised in a fuel tank, and any electric machine 16 is typically powered by electricity supplied from at least one energy storage or transformation device, e.g. a battery or a fuel cell (not shown). The hydrogen combustion engine 15 is preferably configured to be operated by an Otto cycle. The operation of the engine system 10 may e.g. be controlled by a controlling apparatus 17.

In FIG. 1, the EATS 20 comprises a plurality of emission reducing modules 30 arranged downstream of an exhaust gas inlet (shown in FIG. 2) of the EATS 20. The emission reducing modules 30 are configured to reduce emissions of the engine exhausts. The plurality of emission reducing modules 30 comprises at least a first emission reducing module 40 and a second reducing module 50. In the embodiment of FIG. 1, the first reducing module 40 is arranged upstream of the second reducing module 50, but as an alternative, the second emission reducing module 50 may be arranged upstream of the first reducing module 40. Thus, the numbering of the plurality of emission reducing modules 30 does not refer to the order at which they are arranged, the numbering (i.e. first, second, etcetera) is only used to differentiate the plurality of emission reducing modules 30 from each other. The first and second emission reducing modules 40, 50 are configured to remove particles, e.g. particulate matter or soot, from the exhaust gases (also referred to as engine exhausts) of the hydrogen combustion engine 15 and to convert nitrogen oxides, also referred to as NOx, with the aid of a catalyst, into diatomic nitrogen, N2, and water and/or carbon dioxide CO2, as will be described with reference to FIGS. 2 and 3. The EATS 20 typically comprise further components such as e.g. piping and additional emission reducing components (not shown in FIG. 1).

Figure 2:
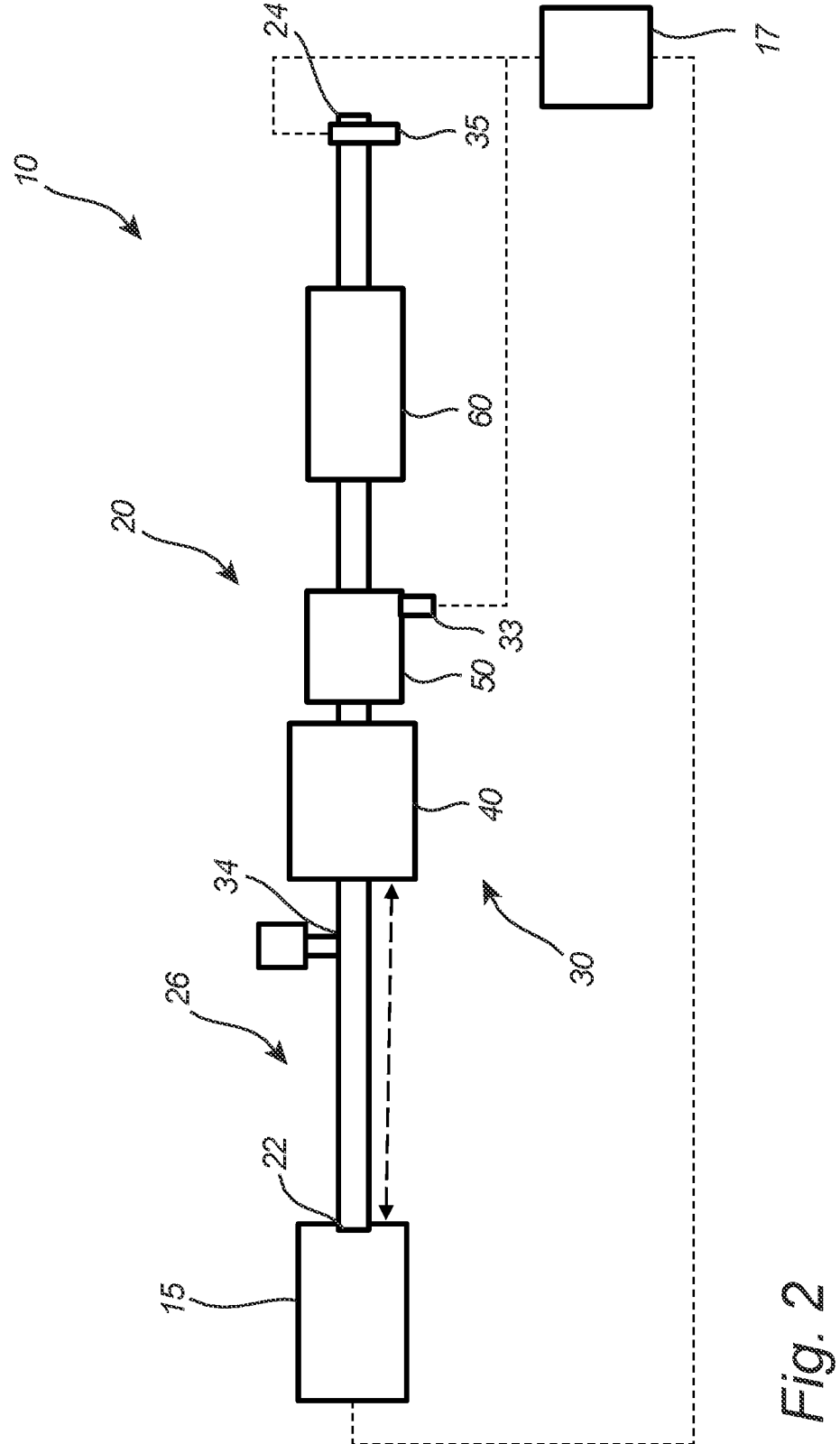
FIG. 2 is a schematic view of an engine system and an exhaust aftertreatment system of the engine system, in accordance with example embodiments of the invention.

In FIG. 2, the engine system 10 of FIG. 1 is shown in greater detail. Thus, the engine system 10 comprises the hydrogen combustion engine 15 and the exhaust aftertreatment system, EATS, 20 configured to reduce emissions of the engine exhausts, described briefly with reference to FIG. 1. The engine exhaust is in the following referred to as exhaust gases.

The EATS 20 comprises an exhaust gas inlet 22 for receiving engine exhaust from the hydrogen combustion engine 15, an outlet 24 for discharging at least partly cleaned exhaust gases from the EATS 20, and a fluid pathway 26 for transporting the exhaust gases from the inlet 22 to the outlet 24. The outlet 24 may e.g. be connected to, or comprise, the tailpipe of the vehicle 1. The EATS 20 further comprises a plurality of emission reducing modules 30 arranged downstream of the exhaust gas inlet 22. The emission reducing modules 30 are configured to reduce emissions of the engine exhausts along the fluid pathway 26. In the embodiment of FIG. 2, the plurality of emission reducing modules 30 is composed of a first emission reducing module 40, a second emission reducing module 50 and a third emission reducing module 60 which will be described in more detail in the following.

Figure 3:
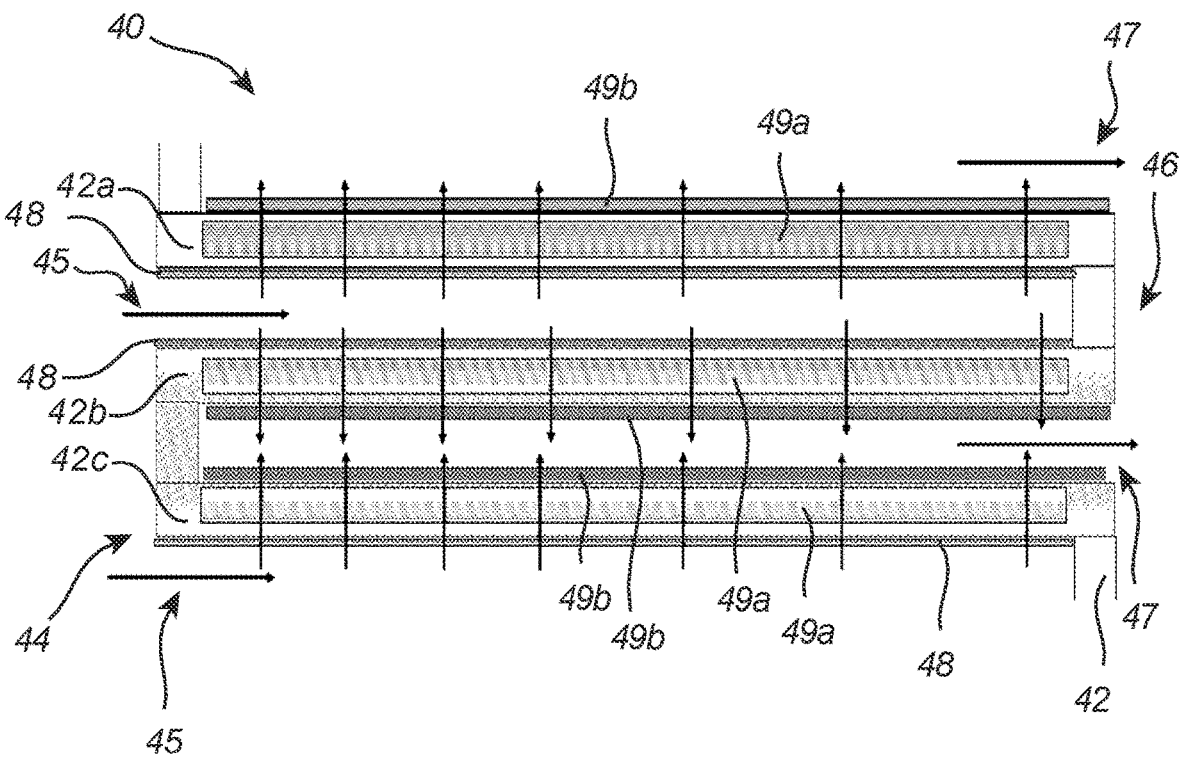
FIG. 3 is a schematic cross sectional view of a portion of the first emission reducing module of the exhaust aftertreatment system of FIG. 2 in accordance with example embodiments of the invention.

Turning briefly to FIG. 3 showing a portion of the first emission reducing module 40 of FIG. 2 in more detail. The first emission reducing module 40 comprises a porous substrate 42 having an inlet face 44 and an outlet face 46. The porous substrate 42 comprises inlet channels 45 extending from the inlet face 44 and towards, but no to, the outlet face 46. Thus, the inlet channels 45 are closed, or blinded. The porous substrate 42 further comprises outlet channels 47 extending from the outlet face 46 and towards, but not to, the inlet face 44. Thus, the outlet channels 47 are closed, or blinded. Stated differently, the inlet channels 45 extend from a respective open end at the inlet face 44 to a respective closed end arranged closer to the outlet face 46 (but within the porous substrate 42), and the outlet channels 47 extend from a respective open end at the outlet face 46 to a respective closed end arranged closer to the inlet face 44 (but within the porous substrate 42). The inlet channels 45 and the outlet channels 47 are separated by a plurality of filter walls 42a, 42b, 42c having a porous structure. Hereby, and as each one of the inlet channels 45 and outlet channels 47 are closed at one of their respective ends, the exhaust gases are forced through the filter walls 42a, 42b, 42c during use of the porous substrate 42. That is, during use of the porous substrate 42, exhaust gases enters the inlet channels 45 at the inlet face 44 and flows towards the outlet face 46. As the inlet channels 45 are closed at their respective end opposite to the inlet face 44, the exhaust gases are forced to flow through the filter walls 42a, 42b, 42c in order to reach the outlet channels 47 (shown by the vertical arrows in FIG. 3). The exhaust gases then leaves the porous substrate 42 via the outlet channels 47 and the outlet face 46.

In FIG. 3, the inlet channels 45 is loaded with a powder coating 48 configured to filter particles from the exhaust gases. The powder coating 48 is e.g. formed by a metal oxide.

For example, the porous substrate 42 may have been loaded with a powder coating comprising aerosols of alumina or silica. The porous substrate 42 may have been loaded with the powder coating by a loading of <10 g/L of dry powder, or <5 g/L of dry powder, or <2 g/L of dry powder. For example, the porous substrate 42 may have been loaded with the powder coating by a loading relative to a filter volume of the porous substrate of between 0.5 g/L and 10 g/L, or of between 0.5 g/L and 5 g/L, or of between 0.5 g/L and 2 g/L. The resulting powder coating concentration relative to the filter volume of the porous substrate may be ranging from 0.01 g/L to 60 g/L.

In FIG. 3, the filter walls 42a, 42b, 42c of the porous substrate 42 are loaded with a selective catalyst reduction, SCR, catalyst coating 49a, here referred to as a first SCR catalyst coating 49a. Moreover, the outlet channels 47 are loaded with a selective catalyst reduction, SCR, catalyst coating 49b, here referred to as a second SCR catalyst coating 49b. The second SCR catalyst coating 49b may be of the same type, or of a different type, than the first SCR catalyst coating 49a.

The first and second SCR catalyst coatings 49a, 49b may be a Vanadia-based coating. The SCR catalyst coating concentration relative to the filter volume of the porous substrate may be ranging from 10 g/L to 150 g/L.

It should be noted that only one of the outlet channels 47 and the filter walls 42a, 42b, 42c need to be loaded with the SCR catalyst coating. That is, only one of the first and second SCR catalyst coatings 49a, 49b need to present in the porous substrate 42. Thus, the SCR catalyst coating may be inside the filter walls 42a, 42b, 42c and/or in the outlet channels 47.

Note that in FIG. 3, only a portion of the first emission reducing module 40 is shown, and that the inlet face 44 is closed for exhaust gas flow except for through the inlet channels 45, and the outlet face 46 is closed for exhaust gas flow except for through the outlet channels 47.

Turning back to FIG. 2, downstream of the first emission reducing module 40, the second emission reducing module 50 is arranged. The second emission reducing module 50 is a selective catalyst reduction, SCR, catalyst unit 50. For example, the SCR catalyst unit 50 is an SCR catalyst stone 50. The SCR catalyst unit 50 may be of a zeolite type, e.g. Cu-zeolite. Thus, the SCR catalyst unit is different to the SCR catalyst coating(s) 49a, 49b of the first emission reducing module 40.

Moreover, in order to provide ammonia to the SCR catalyst coating 49a, 49b and/or the SCR catalyst unit 50, the EATS 20 comprises an injector 34 configured to inject a reductant to the fluid pathway 26 upstream of at least the first occurring emission reducing module of the EATS 20, and downstream of the exhaust gas inlet 22. The reductant may e.g. be urea. Thus, the injector 34 may be configured to inject urea.

As seen in the embodiment of FIG. 2, the first emission reducing module 40 (comprising the porous filter 42 shown in FIG. 3) is arranged as the first occurring emission reducing module of the EATS 20 downstream of the exhaust gas inlet 22. Hereby, the exhaust gases of the EATS 20 first encounter the porous structure 42 and the powder coating 48, wherein particulate emissions, such as e.g. sulphur containing emissions, is filtered from the exhaust gases, thereby reducing the deterioration of the downstream arranged SCR catalyst (as the SCR catalyst coatings 49a, 49b, and the SCR catalyst unit 50). Moreover, the porous filter 42 may be easily accessible in the EATS 20, and may thus be made accessible for maintenance or exchange. For example, the porous filter 42 may be accessed via the exhaust gas inlet 22. Moreover, by arranging the first emission reducing module 40 as the first occurring emission reducing module of the EATS 20 downstream of the exhaust gas inlet 22, the positioning of the injector 34 may be more freely chosen as there is no other emission reducing module between the exhaust gas inlet 22 and the first emission reducing module 40. The injector may be arranged anywhere between the exhaust gas inlet 22 and the first emission reducing module 40, indicated by the dashed arrow in FIG. 2.

Figure 4:
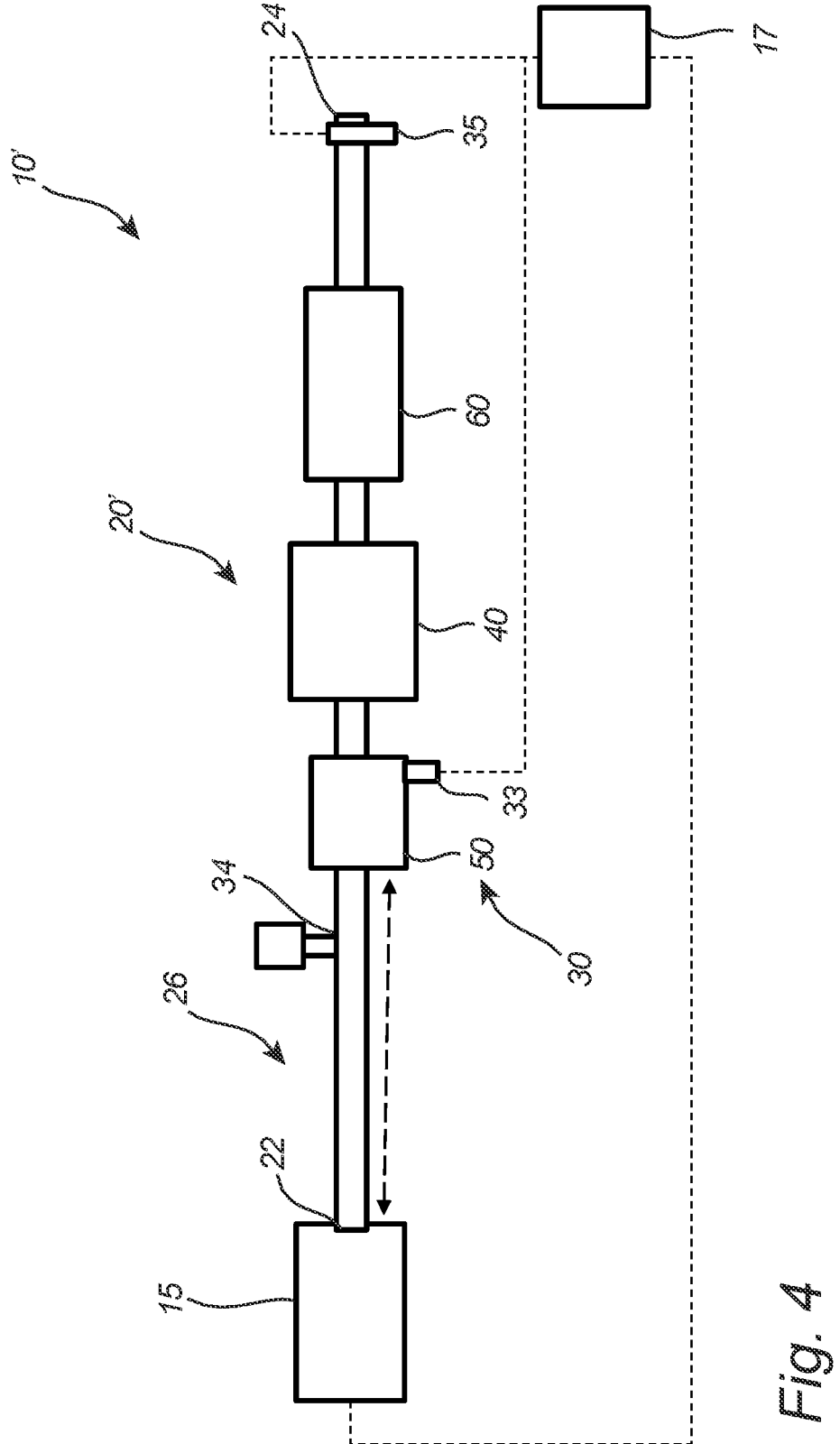
FIG. 4 is a schematic view of yet another engine system and an exhaust aftertreatment system of the engine system, in accordance with example embodiments of the invention.

Turning to FIG. 4, showing an alternative set-up of the engine system 10 of FIG. 2. In the engine system 10' of FIG. 4, the EATS 20' comprises the same components, and in particular the same plurality of emission reducing modules 30 as in the EATS 20 of FIG. 2, why the same reference numerals are used in FIG. 4. However, in FIG. 4, the second emission reducing module 50, being the SCR catalyst unit 50 is arranged as the first occurring emission reducing module of the EATS 20' downstream of the exhaust gas inlet 22. Hereby, the exhaust gases first encounter the SCR catalyst unit 50 and NOx emissions may be efficiently reduced. Moreover, the SCR catalyst unit 50 may be easily accessible in the EATS 20', and may thus be made accessible for maintenance or exchange. For example, the SCR catalyst unit 50 may be accessed via the exhaust gas inlet 22. It should be noted that also in the embodiment of FIG. 4, the positioning of the injector 34 may be freely chosen, here between the exhaust gas inlet 22 and the second emission reducing module 50 (indicated by the dashed arrow in FIG. 4).

The third emission reducing module 60 of the EATS 20, 20' of FIGS. 2 and 4 is optional. In the embodiments of FIGS. 2 and 4, the third emission reducing module 60 is one of: an oxidation catalyst, an ammonia slip catalyst, a secondary particulate filter. For example, in case the third emission reducing module 60 is an ammonia slip catalyst, any ammonia slip from the corresponding SCR catalyst (of the first and/or second emission reducing modules 40, 50) may be handled. In the embodiments of FIGS. 2 and 4, the third emission reducing module 60 is arranged downstream of both of the first and second emission reducing modules 40, 50. However, according to at least one example embodiment, the third emission reducing module 60 is arranged in between the first and second emission reducing modules 40, 50. For example, in such embodiments, the third emission reducing module 60 may be an oxidation catalyst or a secondary particulate filter. However, in such embodiments, the third emission reducing module 60 is still arranged downstream of the first emission reducing module 40 and/or the second emission reducing module 50, whichever being arranged as the first occurring emission reducing module of the EATS 20, 20' downstream of the exhaust gas inlet 22.

Note that in both FIG. 2 and FIG. 4, the third emission reducing module 60 is optional and may be omitted.

The engine system 10 of FIG. 2, and engine system 10' of FIG. 4, are typically operated in the following manner: engine exhausts, or exhaust gases (to be cleaned) from the hydrogen combustion engine 15, enter the EATS 20, 20' via the exhaust gas inlet 22, and encounters the first occurring emission reducing module downstream of the exhaust gas inlet 22, the first occurring emission reducing module being either the first emission reducing module 40 or the second emission reducing module 50. Thereafter, the exhaust gases passes through the other one of the first and second emission reducing module 40, 50 (which is not being the first occurring emission reducing module). Typically, upstream of the first occurring emission reducing module downstream of the exhaust gas inlet, reductant is injected via the injector 34. The injected reductant is thus mixed with the exhaust gases. As the exhaust gases typically are hot, the reductant is evaporated and hydrolysed into ammonia. The ammonia and exhaust gases thereafter encounters the SCR catalyst coating 49a, 49b and/or the SCR catalyst unit 50 for achieving catalytic reduction of the NOx, whereafter the cleaned exhaust gases are discharged from the EATS 20, 20' via the outlet 24, possibly subsequent to passing the third emission reducing module 60. Thus, by the first and second emission reducing modules 40, 50, particles, e.g. particulate matter or soot, is removed from the exhaust gases owing to the powder coating 48, and NOx is converted, with the aid of a catalyst, into diatomic nitrogen, N2, and water, owing to the SCR catalyst coatings 49a, 49b and the SCR catalyst unit 50.

As also shown in FIGS. 2 and 4, the EATS 20, 20' may comprise means for providing determination/measurement of various parameters, such as e.g. the temperature of the SCR catalyst unit 50 by means of a temperature sensor 33, and/or the NOx at the outlet 24 of the EATS 20, 20' by means of a NOx sensor 35. The operation of the engine system 10, 10' may as previously described be controlled by controlling apparatus 17.

It should be noted that the first, second and third emission reducing modules 40, 50, 60 are structurally and (at least partly) functionally separated from each other. For example, each one of the first, second and third emission reducing module 40, 50, 60 may be housed in a separate container or canister.

It is to be understood that the present invention is not limited to the embodiments described above and illustrated in the drawings; rather, the skilled person will recognize that many changes and modifications may be made within the scope of the appended claims. For example, the EATS may be used for cleaning exhaust gases of other engines than hydrogen combustion engines, e.g. in a dual-fuel engine system (in which one of the engines is a hydrogen combustion engine). For example, the present EATS may be used to clean exhaust gases, e.g. by converting NOx emissions, from the exhaust of internal combustion engines based on H2 (Hydrogen) or a mix of H2 and natural gas.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An engine system comprising a hydrogen combustion engine and an exhaust aftertreatment system configured to reduce emissions of the engine exhausts, wherein the EATS comprises:

an exhaust gas inlet for receiving engine exhaust from the hydrogen combustion engine;

a plurality of emission reducing modules arranged downstream of the exhaust gas inlet and being configured to reduce emissions of the engine exhausts, the plurality of emission reducing modules comprising at least:

a first emission reducing module with a porous substrate having an inlet face and an outlet face, the porous substrate comprising inlet channels extending from the inlet face, and outlet channels extending from the outlet face; the inlet channels and the outlet channels being separated by a plurality of filter walls having a porous structure; the inlet channels of the porous substrate being loaded with a powder coating configured to filter particles from the engine exhaust, and the porous structure of the filter walls and/or the outlet channels of the porous substrate being loaded with a selective catalyst reduction, SCR, catalyst coating;

a second emission reducing module being a selective catalyst reduction, SCR, catalyst unit;

wherein the first emission reducing module is arranged as the first occurring emission reducing module of the EATS downstream of the exhaust gas inlet, wherein the EATS is free of any oxidation catalyst arranged downstream of the exhaust gas inlet and upstream of the first and second emission reducing modules.

2. The engine system according to claim 1, wherein the plurality of emission reducing modules further comprises a third emission reducing module selected from: an oxidation catalyst, an ammonia slip catalyst, a secondary particulate filter, and wherein the third emission reducing module is arranged downstream of the first or second emission reducing module, whichever being arranged as the first occurring emission reducing module of the EATS downstream of the exhaust gas inlet, or is arranged downstream of both of the first and second emission reducing modules.

3. The engine system according to claim 1, wherein the EATS further comprises:

an injector configured to inject a reductant for providing ammonia to the SCR catalyst coating and/or the SCR catalyst unit, wherein the injector is arranged upstream of the first and second emission reducing modules, and downstream of the exhaust gas inlet.

4. The engine system according to claim 1, wherein the SCR catalyst coating of the first emission reducing module is a Vanadia-based coating.

5. The engine system according to claim 1, wherein the porous substrate has been loaded with a dry powder comprising a metal oxide.

6. The engine system according to claim 1, wherein the porous substrate has been loaded with the powder coating by a loading of <10 g/l of dry powder.

7. The engine system according to claim 1, wherein the powder coating concentration relative to a filter volume of the porous substrate is ranging from 0.01 g/L to 60 g/L.

8. The engine system according to claim 1, wherein the SCR catalyst coating concentration relative to a filter volume of the porous substrate is ranging from 10 g/L to 150 g/L.

9. The engine system according to claim 1, wherein the hydrogen combustion engine is configured to be operated by an Otto cycle.

10. A vehicle comprising an engine system according to claim 1.

11. The engine system according to claim 1, wherein the porous substrate has been loaded with the powder coating by a loading of <5 g/l of dry powder.

12. The engine system according to claim 1, wherein the porous substrate has been loaded with the powder coating by a loading of <2 g/l of dry powder.

* * * * *